United States Patent Office 3,337,840
Patented Aug. 22, 1967

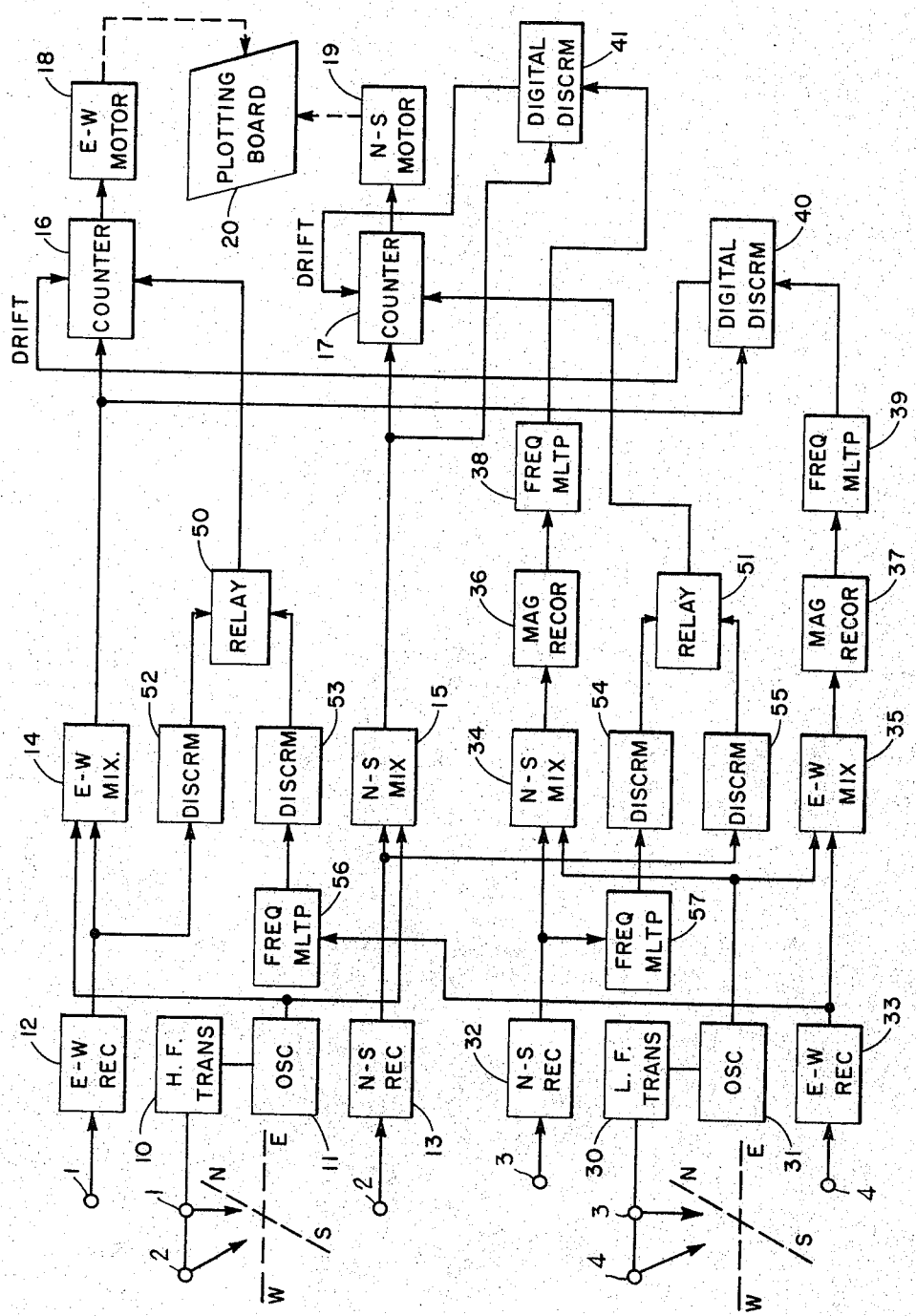

3,337,840
DOPPLER NAVIGATION SYSTEM FOR NAUTICAL VESSELS
Edwin E. Turner, Newport, R.I., assignor, by mesne assignments, to the United States of America as represented by the Secretary of the Navy
Filed Oct. 18, 1965, Ser. No. 497,567
5 Claims. (Cl. 340—3)

ABSTRACT OF THE DISCLOSURE

This invention relates to a Doppler navigation system of the type wherein sound beams are radiated along north-south and east-west directions and the Doppler signals present in the echoes returned from the ocean bottom are employed to indicate the vehicle's position. More specifically, both high and low frequency beams are radiated and the low frequency beam is utilized to make contact with the bottom when the high frequency signal loses contact with it. The low frequency signal contains information concerning the gross ocean drift, and this drift is taken into account in the plotting operation.

---

The present invention relates generally to navigation systems for marine craft and, more particularly, to a Doppler navigation system which can be used in shallow and deep waters.

In applicant's U.S. Patent No. 3,065,463 of Nov. 20, 1962, there is disclosed a Doppler navigation system which indicates continuously the position of a vehicle relative to an initial or reference location. When used with marine craft, acoustic wave energy is transmitted and received in two different directions which are always perpendicular to each other and referenced to preselected earth coordinates. To obtain the Doppler shift signals indicative of the vehicle's velocity components in these two directions, the echo signals are beat with the carrier in a suitable mixer. After amplification, the beat signals are fed to a digital counter having a predetermined countdown. The output of each digital counter is supplied directly to a stepping motor which integrates velocity into distance and drives a recording pointer in a horizontal and vertical direction across a plotting board.

To allow for a reversal in vehicle direction, the echo signals are also fed to discriminators which compare the output of the receivers to the transmitted carrier. This comparison indicates whether or not the plotting motor should be reversed or the Doppler shift signal added or subtracted to the count registered in the counter during the interval involved.

When a vehicle equipped with such a Doppler navigator proceeds into deep water, the high frequency signals radiated from the transmitter lose contact with the ocean bottom because of transmission losses. Despite this loss, however, the system continues to function because of the presence at the receiver of volume reverberation signals, and the position of the vehicle continues to be plotted on the plotting board. However, this mode of operation, while it does take into account the effects of wind acting on the vehicle, does not compensate for any drift of the whole body of ocean with respect to the earth. Hence, the true position of the vehicle is not shown.

It is accordingly a primary object of the present invention to provide a Doppler navigation system for marine vehicles which can operate in deep water.

A secondary object of the present invention is to provide a high frequency Doppler navigation system wherein the gross drift of the ocean is taken into account in the plotting operation.

Another object of the present invention is to provide a Doppler navigator which can be used in shallow or deep water with comparable accuracy.

A yet still further object of the present invention is to provide an arrangement for determining the gross ocean drift in areas of extreme depth and for compensating for this drift in high frequency Doppler navigators.

Briefly and in general terms, the above objects are realized by utilizing, along with the high frequency system, a low frequency system whose signals are also radiated along the same two mutually perpendicular directions as the high frequency signals. These low frequency signals are transmitted whenever the high frequency signals lose contact with the ocean bottom. Since the low frequency signals do not experience the same degree of attenuation as the high frequency signals, they propagate to the ocean bottom and are reflected therefrom. Because these signals make contact with the bottom, they contain information concerning the gross ocean drift with respect to the bottom as well as the speed and the direction of the vehicle over the ocean bottom.

The low frequency echo signals are therefore mixed with the low frequency carrier to produce Doppler shift signals. By comparing these Doppler signals with the high frequency Doppler shift signals derived from the reverberation echoes, a measure of the two mutually perpendicular components of the gross ocean drift is obtained. However, this comparison is done on a basis which takes into account the difference in frequencies between the two transmitted signals. More specifically, the invention utilizes a low frequency signal which is a submultiple of the high frequency signal, and the low frequency Doppler shift signal is multiplied by a factor corresponding to the ratio between the high and low frequencies. After this multiplication, the two Doppler shift signals are compared and the difference therebetween, which is a measure of the gross ocean drift, is injected directly into the high frequency counting circuit to compensate for this drift.

The system also includes a pair of discriminators which compare the high and low frequency return signals to determine whether this drift should be added or subtracted from the high frequency counting circuit. With this arrangement, the stepping motors that operate the plotting board in the two mutually perpendicular directions are advanced or retarded by proper amounts to take into account any gross ocean drift when the high frequency system has volume reverberation echoes as its input signal.

Other objects, advantages and novel features of the invention will become apparent from the following detailed description of the invention when considered in conjunction with the accompanying drawing, the single figure of which schematically illustrates a preferred embodiment thereof.

Referring now to the drawing, it will be seen that the over-all system includes a high frequency and a low frequency transmitting and receiving arrangement which radiate directional beams in two mutually perpendicular directions which, for example, correspond to north and east and detect echo signals arriving from these same directions. The high frequency system in the top half of the drawing includes a transmitter 10 energized by a high frequency oscillator 11. This transmitter drives a pair of transducers 1 and 2 which are stabilized with respect to the vehicle so that their beams are directed at a predetermined angle with respect to the horizontal, regardless of the vehicle's pitching or rolling. These transducers are also connected by a suitable synchro drive, not shown, to a compass so that they are always orientated in a northerly and an easterly direction, regardless of the direction of travel of the vehicle.

When they operate in a receiving mode, these transducers detect echoes returning from the ocean bottom or volumetric echoes returning from the ocean itself and deliver them to corresponding east and west, and north and south receivers 12 and 13, respectively. The outputs of these receivers are fed to east and west, and north and south mixers 14 and 15, each of which has as its other input a signal derived from high frequency oscillator 11. The beat signals produced in these mixers are the high frequency Doppler shift signals mentioned hereinbefore, and these signals are fed to counters 16 and 17 which operate the east-west and north-south stepping motors 18 and 19 driving the two-dimensional plotting board 20.

Counters 16 and 17 are binary counters of the same number of stages, and these counters produce pulse outputs at rates $1/N$, the signal rates from their associated members, where N is an integral number. Both circuits are capable of reversal and can perform subtraction and addition, depending upon the control exercised over them by relays 50 and 51 within a counting interval. These counters drive the stepping motors which provide an absolute shaft rotation proportional to the registered count.

The system so far described corresponds in all essentials to the arrangement disclosed in applicant's above-mentioned patent. Although this system is suitable for shallow water, it cannot be extended into deep water without an error being introduced into the plotting operation. The reason for this is that in deep water the high frequency signals lose contact with the bottom because of attenuation losses. Despite this, however, input signals are still available at the high frequency receivers 12 and 13. However, these input signals correspond to the volume reverberation echoes mentioned hereinbefore. Thus, while the system continues to plot the vehicle's position as it moves into deep water, this plot is not accurate since it does not take into account any drift of the whole body of the ocean with respect to the earth.

To ascertain this drift, the present invention utilizes a low frequency system which, up to a point, is similar to the high frequency system. This low frequency system, which is shown in the lower part of the drawing, includes a low frequency transmitter 30 energized from a low frequency oscillator 31. This transmitter, like its counterpart in the high frequency system, also energizes a pair of transducers 3 and 4. These transducers are mounted under the high frequency transducers and orientated at the same angle and along the same relatively northerly and easterly directions as these transducers. They are also coupled to the same servo system and compass so that they are continuously aligned in these two directions, regardless of vehicle motion or movement.

The frequency of oscillator 31 is a submultiple of the frequency of oscillator 11. The reason for this selection is to facilitate the manner in which the drift correction signals may be injected into counters 16 and 17 in the high frequency system which control the east-west and north-south stepping motors 18 and 19. Since the low frequency system is employed solely for the purpose of producing a drift compensation signal by having the low frequency signal a submultiple of the high frequency signal, this correction signal can be compatible with the high frequency signals which are being registered in the above counters by a simple multiplication process. Thus, a minimum amount of change need be made to the high frequency system to have it operate in deep water environments.

The low frequency system is not continuously operated, but activated only when the vehicle moves into deep water and, then, only on a periodic basis so as to supply from time to time a proper drift correction signal to the high frequency system. Since the high frequency and low frequency systems do not operate simultaneously, there is no confusion in these systems. When the low frequency system is activated, the transmitted signals, because of their improved propagation characteristics, make contact with the bottom and are reflected therefrom. Thus, these signals, as mentioned hereinbefore, are unlike the high frequency signals in that they reflect the effects of any gross ocean movement with respect to the bottom. The low frequency echoes are detected at north-south and east-west receivers 32 and 33, respectively, and then fed to mixers 34 and 35, each of which has as its other input a signal originating at low frequency oscillator 31. Thus, low frequency Doppler shift signals are produced in a manner similar to that in which the high frequency Doppler shift signals are produced.

The low frequency Doppler shift signals are recorded in suitable magnetic recorders and reproducers 36 and 37 for playback at any desired time. The reason for recording these signals is that the drift correction need not be determined for every high frequency transmission. This correction can be ascertained periodically and, since it will not change appreciably during several high frequency transmissions, it can be recorded and used for a given number of such high frequency transmissions.

Magnetic recorders and reproducers 36 and 37 may be controlled through well-known gating circuits so that only the middle portion of each echo is gated out during any readout operation. By reading out only the center portion of each echo pulse, the steady-state value of the Doppler frequency representing the sum total of ship and water motion over the ground is obtained.

The low frequency Doppler shift signals fed out of the recorders have their frequencies multiplied in circuits 38 and 39 by a factor corresponding to the ratio between the high and low frequencies. As a result of this multiplication, the output signals from these multipliers are in the same frequency range as the high frequency Doppler shift signals produced in mixers 14 and 15. Consequently, these two sets of signals can be compared on a meaningful basis. This is done in digital discriminators 40 and 41. These discriminators are, therefore, coupled to the multiplying circuits and to mixers 14 and 15. In effect, they compare the frequencies of these two signals and provide an output which is a function of their difference. This output, it will be appreciated, is the drift correction signal sought. In other words, since the high frequency Doppler shift signals represent vehicle movement with respect to the water and since the low frequency multiplied signals represent vehicle motion with respect to the bottom, the only difference between these signals is the gross movement of the ocean with respect to the bottom. Thus, the outputs of digital discriminators 40 and 41 are fed as correction signals into the high frequency counters 16 and 17, thus correcting the high frequency system for its failure to take into account any gross ocean movement.

To determine whether or not the drift correction signal produced in the digital discriminators 40 and 41 should be added or subtracted from the high frequency counters, the over-all system contains two sets of discriminators 52, 53, the east-west discriminators, and 54, 55, the north-south discriminators. Discriminator 52 has as its input signal the east-west high frequency echo, while discriminator 53 has as its input the east-west low frequency signal after it has been multiplied in circuit 56 so as to bring it into the same frequency range as the high frequency signal. These discriminators control a differential relay 50 whose position determines the manner in which the drift correction signal from digital discriminator 40 enters binary counter 16, that is, whether or not this correction is added or subtracted to the count registered therein during any counting interval.

It will be appreciated that if the input signal to discriminator 52 is of a higher frequency than the input signal of discriminator 53, relay 50 causes the drift correction signal to be subtracted during the counting interval since in this case the gross ocean drift is in a direction opposite to the vehicle movement. By the same token, if the signal input to discriminator 53 is of a higher frequency, then relay 50 causes the drift signal to be added to the count registered in counter 16.

The high frequency echo returned from the north-south direction is fed to discriminator 55 while the low frequency signal returned from the same direction, after being multiplied in frequency in circuit 57, is fed to discriminator 54 in much the same way as described above in connection with the east-west circuits. Discriminators 54 and 55 control a differential relay 51 whose function is the same as relay 50 described hereinbefore. It will thus be seen that the over-all system has a provision for determining whether the east and west, and north and south components of the drift correction signals should be added or subtracted in counters 16 or 17. Consequently, the direction, as well as the amount, of the gross ocean drift is compensated for in the high frequency system.

In the system shown, the low frequency Doppler shift signals are recorded and, when subsequently read out, frequency multiplied to bring them into the correct frequency range. However, it would be pointed out that the recording operation may take place anywhere along the low frequency circuit, such as, for example, at the output of the north-south and east-west receivers 32 and 33. Likewise, the various discriminators 52, 53, 54 and 55 need not all be centered about the same midfrequency. If these discriminators are tuned to the low frequency and high frequency range, the frequency multiplication circuits 56 and 57 are not necessary. In this regard, the only requirement is that the over-all system include suitable discriminating circuits for comparing the relative amounts of the high and low frequency shifts in the different echoes to determine the direction of input of the drift correction signals.

Obviously many modifications and variations of the present invention are possible in the light of the above teachings. It is therefore to be understood that within the scope of the appended claims the invention may be practiced otherwise than as specifically described.

What is claimed is:

1. In a Doppler navigation system for nautical vessels, the combination of
    means for transmitting high frequency sound signals along two mutually perpendicular directions and for detecting the high frequency echo signals returned from the ocean bottom or from the water itself when said sound signals lose contact with the bottom;
    means for deriving from said echo signals high frequency Doppler shift signals;
    a counting device for registering the number of cycles of said high frequency Doppler shift signals which occur within a given counting interval;
    means operative when said high frequency sound signals lose contact with the ocean bottom for producing low frequency Doppler shift signals which represent the velocity components of said vessel along said two mutually perpendicular directions with respect to the ocean bottom;
    means for deriving from said low frequency and said high frequency Doppler shift signals drift correction signals which correspond to components of the gross drift of the ocean along said two mutually perpendicular directions;
    means for modifying the count registered in said counting device by adding or subtracting therefrom the drift correction signals, depending upon whether the components of the gross ocean drift are in the same or the reverse direction as vessel movement; and
    means for positioning a plotting board in two mutually perpendicular directions in accordance with said modified counts.

2. In a Doppler navigation system of the type wherein two high frequency sound beams are radiated towards the bottom along two different directions and the echo signals subsequently detected are mixed with the transmitted signals to produce Doppler shift signals which are fed to a pulse counter for registering therein the number of cycles of said Doppler shift signals which occur within a given counting interval with the count so produced being indicative of the velocity component of said vessel along said two directions, the combination of
    means for radiating low frequency sound signals from the vessel towards the ocean bottom along the same two directions when said high frequency sound signals lose contact with the bottom and reverberation signals are being returned from the water itself, said low frequency signals being a submultiple of the high frequency signals;
    means for deriving from the low frequency echo signals low frequency Doppler shift signals which indicate the velocity components of said vessel along said two directions as measured from the ocean bottom;
    means for multiplying the frequencies of said low frequency Doppler shift signals by a factor corresponding to the ratio between said high frequency sound signals and said low frequency sound signals;
    means for comparing the high frequency Doppler shift signal obtained from the reverberation echoes when said high frequency sound signals lose contact with the bottom with said multiplied low frequency Doppler shift signals to produce correction signals corresponding to the difference in the frequencies of the signals compared;
    means for changing the count registered in the pulse counter by either adding or subtracting said correction signals, depending upon whether the gross ocean drift is in the same or opposite direction as the vessel movement; and
    means operative by said pulse counters for positioning a plotting board in two mutually perpendicular directions.

3. In a Doppler navigation system for nautical vessels of the type wherein high frequency sound signals are radiated in two mutually perpendicular directions and the echoes subsequently received are mixed with the radiated signals to produce high frequency Doppler shift signals which are registered in a counter during a given time interval, the combination of
    means for radiating low frequency sound signals along the same two directions when said high frequency signals lose contact with the ocean bottom because of attenuation losses and reverberation echoes are received;
    means for producing low frequency Doppler shift signals indicative of the velocity components of said vessel along two directions with any gross drift of the ocean taken into account;
    means for deriving from said low frequency Doppler shift signals and said high frequency Doppler shift signals drift correction signals indicative of the gross ocean drift velocity components in said two directions;
    means for changing the count registered in said counter by either adding or subtracting said drift correction signals, depending upon whether or not the gross ocean drift is in the same or opposite direction as the vessel's movement; and
    means for positioning a plotting board in two mutually perpendicular directions in accordance with the changed counts.

4. In a Doppler navigation system for nautical vessels, the combination of
    means for radiating from said vessel and along two mutually perpendicular directions high frequency sound signals and for detecting the high frequency echo signals returned from the ocean bottom when said high frequency sound signals make contact therewith or high frequency reverberation signals returned from the water itself when said high frequency sound signals lose contact with the bottom;
    means for producing high frequency Doppler shift signals by mixing the high frequency radiated sound signals with the detected high frequency echo or reverberation signals, said high frequency Doppler shift signals indicating the velocity components of said vessel along said two directions with respect to the ocean;

means for radiating from the vessel and along the same two directions when said high frequency sound signals lose contact with the ocean bottom low frequency sound signals and for subsequently detecting the low frequency echo signals returned from the ocean bottom, said low frequency signals having a frequency which is a submultiple of said high frequency sound signals;

means for producing low frequency Doppler shift signals by mixing the low frequency radiated sound signals with the low frequency echo signals, said low frequency Doppler shift signals indicating the velocity components of said vessel along said two directions with respect to the ocean bottom;

means for multiplying the frequency of said low frequency Doppler shift signals by a factor corresponding to the ratio between said high frequency and low frequency sound signals;

means for comparing the frequencies of said high frequency Doppler shift signals and said multiplied low frequency Doppler shift signals to obtain correction signals whose frequency is equal to the difference between said compared signals;

means for counting the number of cycles of said high frequency Doppler shift signals which occur during a given counting interval;

means for modifying the count so registered by either adding or subtracting said correction signals, depending upon whether corresponding velocity components of said vessel with respect to the ocean are greater or less than corresponding velocity components of said vessel with respect to the bottom, thereby to componsate for any gross ocean drift; and means for positioning a plotting board in two mutually perpendicular directions in accordance with the modified counts.

5. In a Doppler navigation system for nautical vessels, the combination of means for radiating from said vessels along the north-south and east-west directions high frequency sound signals and for detecting the high frequency echo signals returned from the ocean bottom or the high frequency reverberation signals returned from the water itself;

means for producing north-south and east-west high frequency Doppler shift signals from the high frequency echo signals or reverberation signals so detected;

means for radiating periodically from the vessel low frequency sound signals along the north-south and east-west directions and for detecting low frequency echo signals returned from the ocean bottom, said low frequency sound signals being radiated when said high frequency sound signals lose contact with the ocean bottom and high frequency reverberation signals are being detected, said low frequency sound signals having a frequency which is a submultiple of the high frequency signals;

means for producing north-south and east-west low frequency Doppler shift signals from the low frequency echoes;

means for recording said north-south and east-west low frequency Doppler shift signals;

means for playing back the recorded north-south and east-west low frequency Doppler shift signals and for multiplying their frequencies by a factor corresponding to the ratio between said high frequency sound signals and said low frequency sound signals;

means for comparing the frequencies of the north-south high frequency Doppler shift signal with the multiplied north-south low frequency Doppler shift signal and the east-west high frequency Doppler shift signal with the multiplied low frequency east-west Doppler shift signals to produce north-south and east-west difference signals, the frequencies of said difference signals being indicative of the components of the gross drift of the ocean in said north-south and east-west directions;

means for counting the number of cycles of said north-south and east-west high frequency Doppler shift signals which occur during a given time interval;

means for modifying the counts so registered by either adding or subtracting therefrom said correction signals, depending upon whether said north-south and east-west high frequency echo signals are higher or lower than the corresponding north-south and east-west low frequency echo signals after said last-mentioned signals have been multiplied by a factor corresponding to the ratio between said high frequency and low frequency sound signals, thereby to compensate for any gross ocean drift; and means for positioning a plotting board along two mutually perpendicular directions in accordance with the north-south and east-west modified counts.

References Cited
UNITED STATES PATENTS 3,065,463  11/1962  Turner _____ 343—9

RODNEY D. BENNETT, *Primary Examiner.*

RICHARD A. FARLEY, *Examiner.*